F. T. HUGHES.
EXTENSION FOR BRAKE LEVERS.
APPLICATION FILED FEB. 7, 1920. RENEWED OCT. 31, 1921.
1,409,447. Patented Mar. 14, 1922.
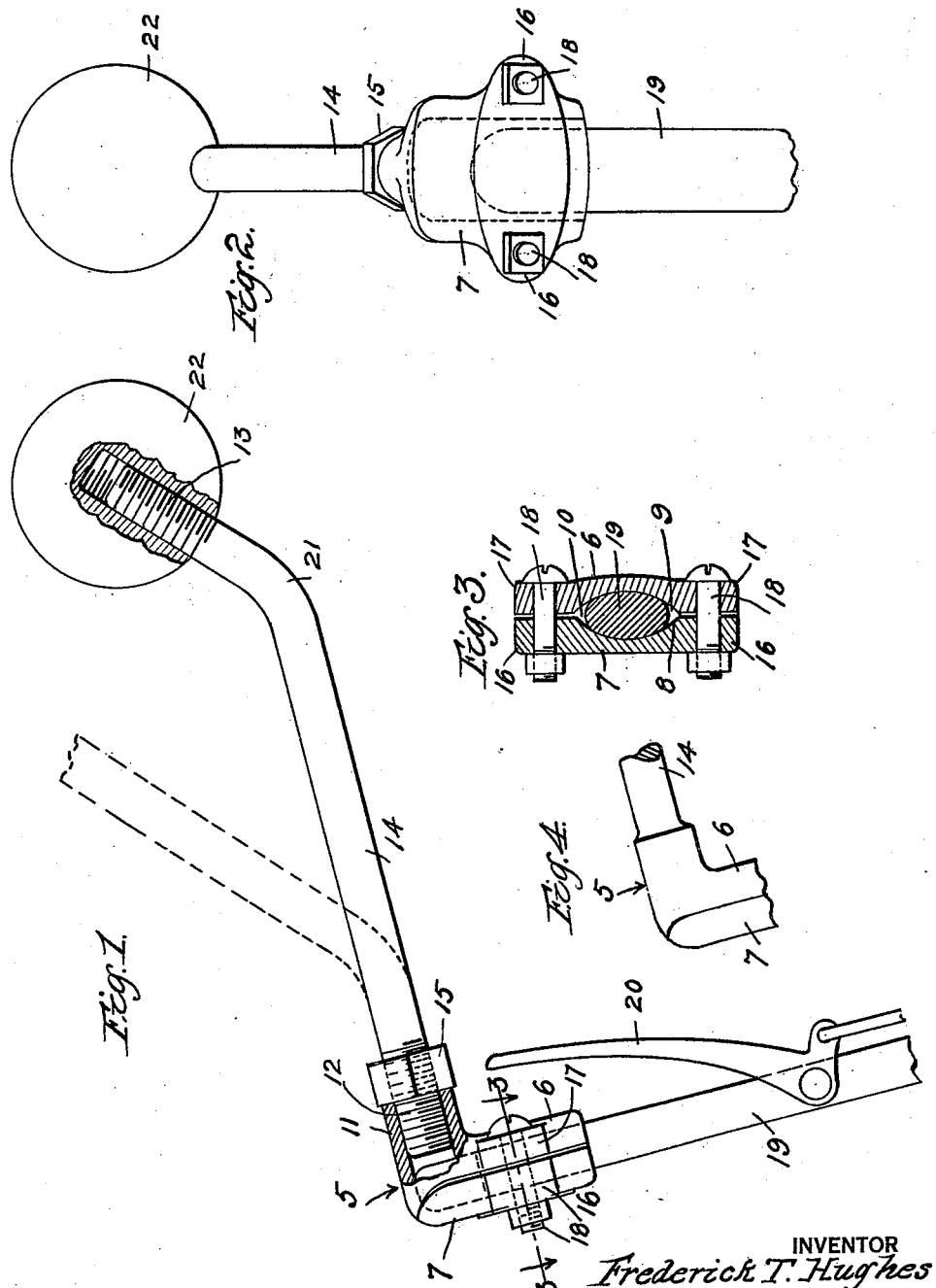
INVENTOR
Frederick T. Hughes
BY
Edmund A. Strauss
ATTORNEY

UNITED STATES PATENT OFFICE.

FREDERICK T. HUGHES, OF LOS ANGELES, CALIFORNIA.

EXTENSION FOR BRAKE LEVERS.

1,409,447. Specification of Letters Patent. Patented Mar. 14, 1922.

Application filed February 7, 1920, Serial No. 356,903. Renewed October 31, 1921. Serial No. 511,769.

*To all whom it may concern:*

Be it known that I, FREDERICK T. HUGHES, a citizen of the United States, residing at Los Angeles, in the county of Los Angeles and State of California, have invented new and useful Improvements in Extensions for Brake Levers, of which the following is a specification.

This invention relates more specifically to a lever extension means for brake levers and like structures utilized for controlling the brakes of a motor vehicle.

A main object of this invention is to provide a lever extension device that may be readily secured to brake levers of various types without the necessity of altering the levers, and which may be quickly adjusted so as to bring the handle within convenient reach of the operator.

A further object is to provide an extension lever means which is economical in manufacture, consists of few parts, and which may be easily applied to and removed from levers of different types.

The above objects are accomplished by means of the extension lever device herein described and illustrated in the accompanying drawings, in which:

Fig. 1 is a side elevation of the extension lever partly in section attached to the upper end of a brake lever, the dotted lines indicating one of the adjusted positions.

Fig. 2 is an end elevation of the extension lever attached to the upper end of a brake lever.

Fig. 3 is a cross section through the extension lever clamping means taken on line 3—3 of Fig. 1.

Fig. 4 is a detail view of a brake lever without the adjustable feature.

Referring more particularly to the drawings, the extension lever device preferably consists of a socketed clamping member 5 consisting of members 6 and 7, each having on their oppositely disposed faces concave depressions 8 and 9 adapted when the members are secured together to form a socket 10 elliptical in cross section. Member 6 at the top and center thereof is provided with a tubular extension 11 extending approximately at right angles to the member. This extension is interiorly threaded and is adapted to receive the threaded ends 12 and 13 of a reversible extension rod 14, a jam nut 15 maintaining the rod 14 in adjusted relation to the clamping member 6, as clearly shown in Fig. 1 of the drawings. Members 6 and 7 are each provided with a pair of apertured ears 16 and 17 through which pass clamping bolts 18, the bolts serving to bring the two members together so as to maintain the socketed clamping member 5 in immovable relation to the upper end of a brake lever 19, the brake lever being provided with the usual latch operating handle 20.

Extension rod 14 is preferably bent at an angle adjacent one end thereof as at 21, so that when the rod is reversed, as clearly shown in dotted lines in Fig. 1 of the drawings, the rod may be disposed at different angles so that the wooden ball operating handle 22 may be disposed in a desired convenient position.

Instead of forming the extension device so that the extension rod may be reversed, I have illustrated a form in Fig. 4 of the drawings, in which the clamping member 6 is formed integral with one end of the rod 14, the clamping member 7 being secured to member 6 in the same manner as in the heretofore described construction. By forming the extension rod and one of the clamping members in one piece, an extension lever can be produced at very small cost, the rod 14 being bent at a convenient angle so as to bring the extension device when applied to the levers of different cars in approximately the correct desired position.

By securing the socketed extension lever to the upper end of the brake lever 19, it will be at once apparent that it will not interfere in the least with the operation of the latch handle or pivoted lever 20, and moreover the brake lever handle will not have to be altered to accommodate my improved extension device.

It will be noted from the above description that my device is especially adapted for use in connection with combination brake and gear shifting levers, as well as brake levers, the device above described being admirably adapted for use in connection with the combination brake and gear shifting levers of Ford motor cars.

What I claim is:

1. A lever extension device, comprising a two part socketed clamping member, means to secure the two members in rigid relation to each other, and a reversible extension rod detachably secured to one of said clamping members.

2. A lever extension device, comprising a two part socketed clamping member, means to secure the two members in rigid relation on the end of an operating lever, an extension rod bent in angular relation to its longitudinal axis, said rod being threaded on its ends, either of said ends adapted to engage one of the members of the socketed clamp, and means to secure the extension rod in an adjusted relation to said clamping member.

3. A lever extension device, comprising a two part clamping member, means to secure the clamping member parts in rigid relation to the end of an operating lever, an extension rod bent in angular relation to its longitudinal axis, said rod being threaded on its ends, either of said ends adapted to engage one of the parts of the clamping member, and means to secure the extension rod in any desired adjusted position to said clamping member.

In witness that I claim the foregoing I have hereunto subscribed my name this 29th day of January, 1920.

FREDERICK T. HUGHES.